Dec. 6, 1960
D. F. McGILL
2,963,117
HYDRAULIC BRAKING SYSTEM
Filed Oct. 22, 1956
4 Sheets-Sheet 3
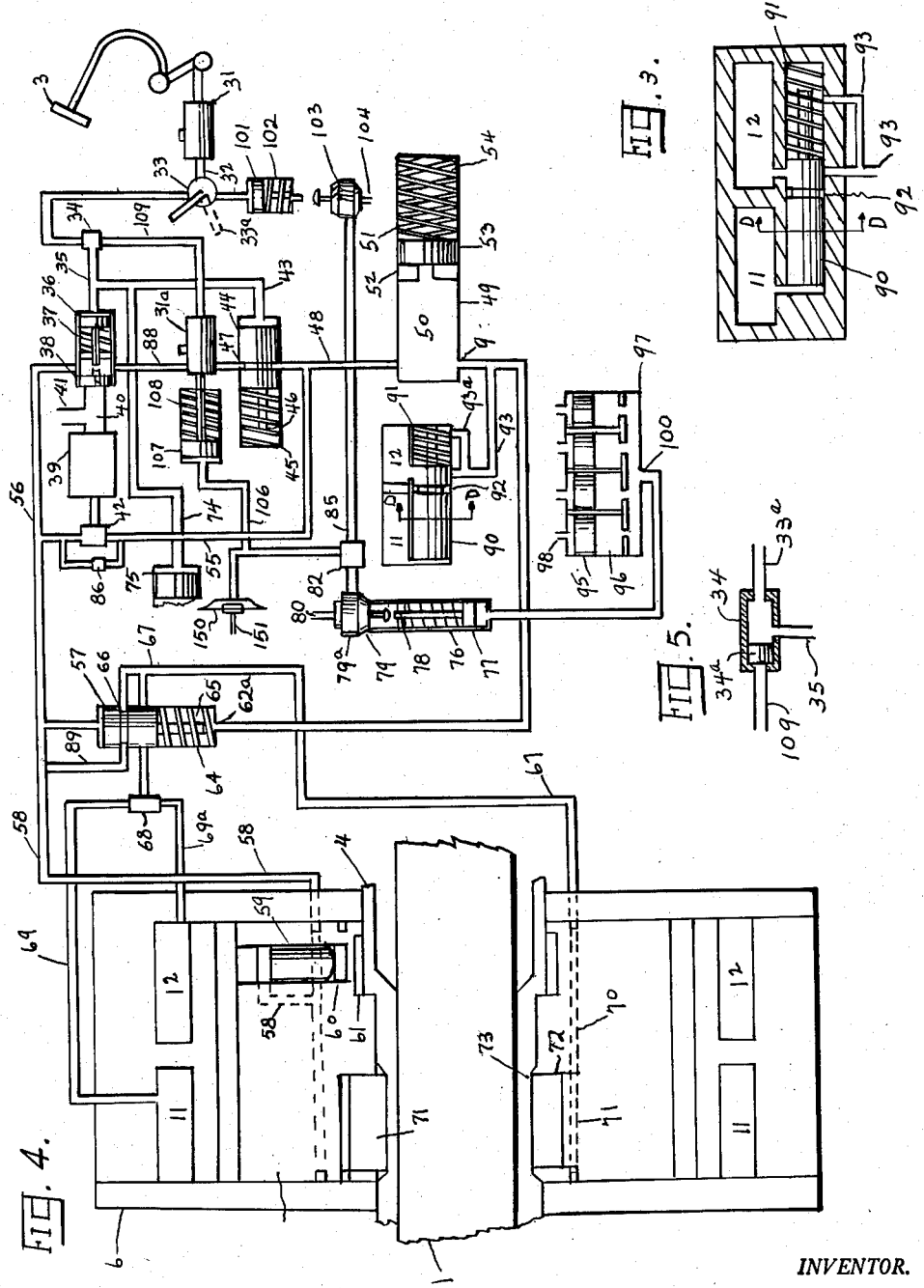
INVENTOR.
DANIEL F. McGILL

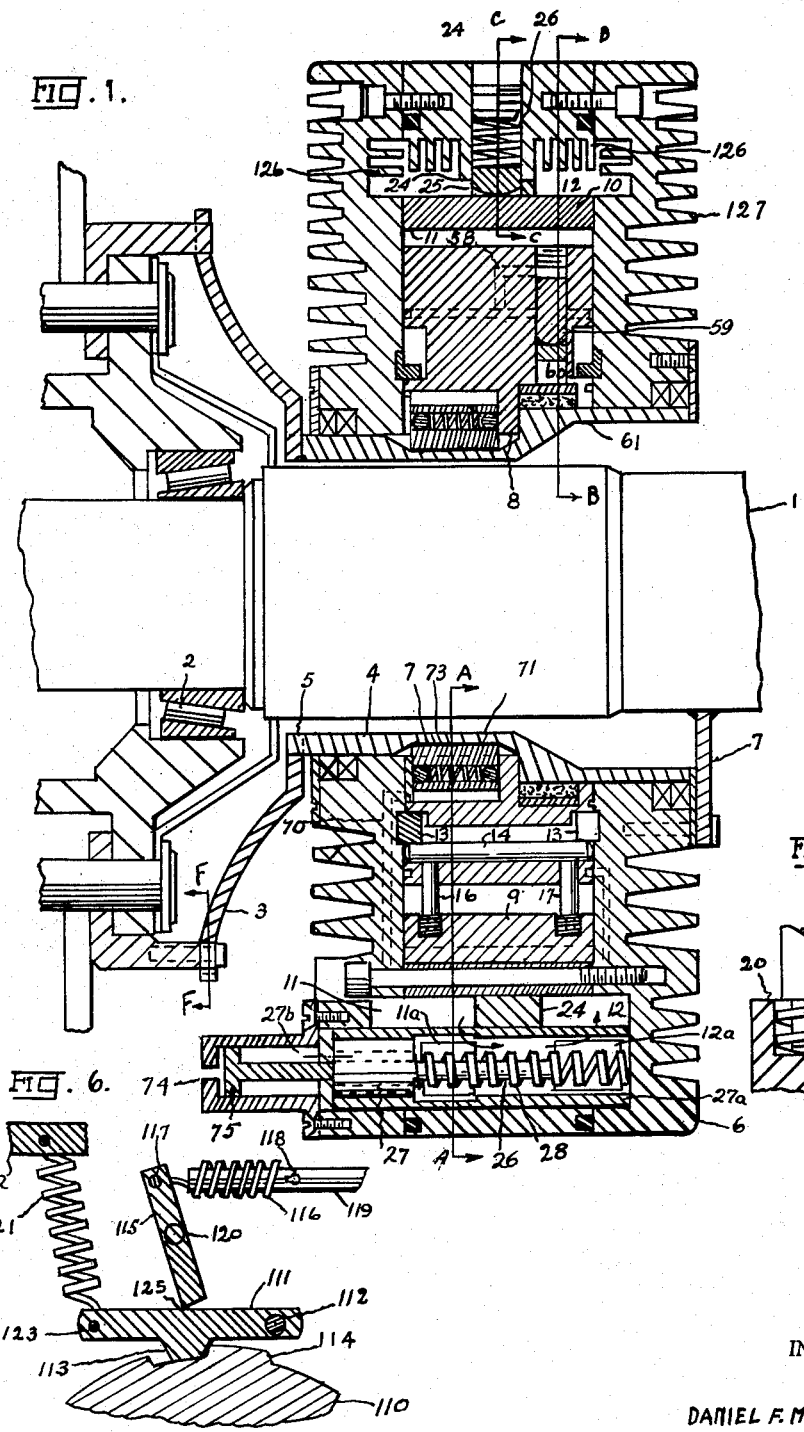

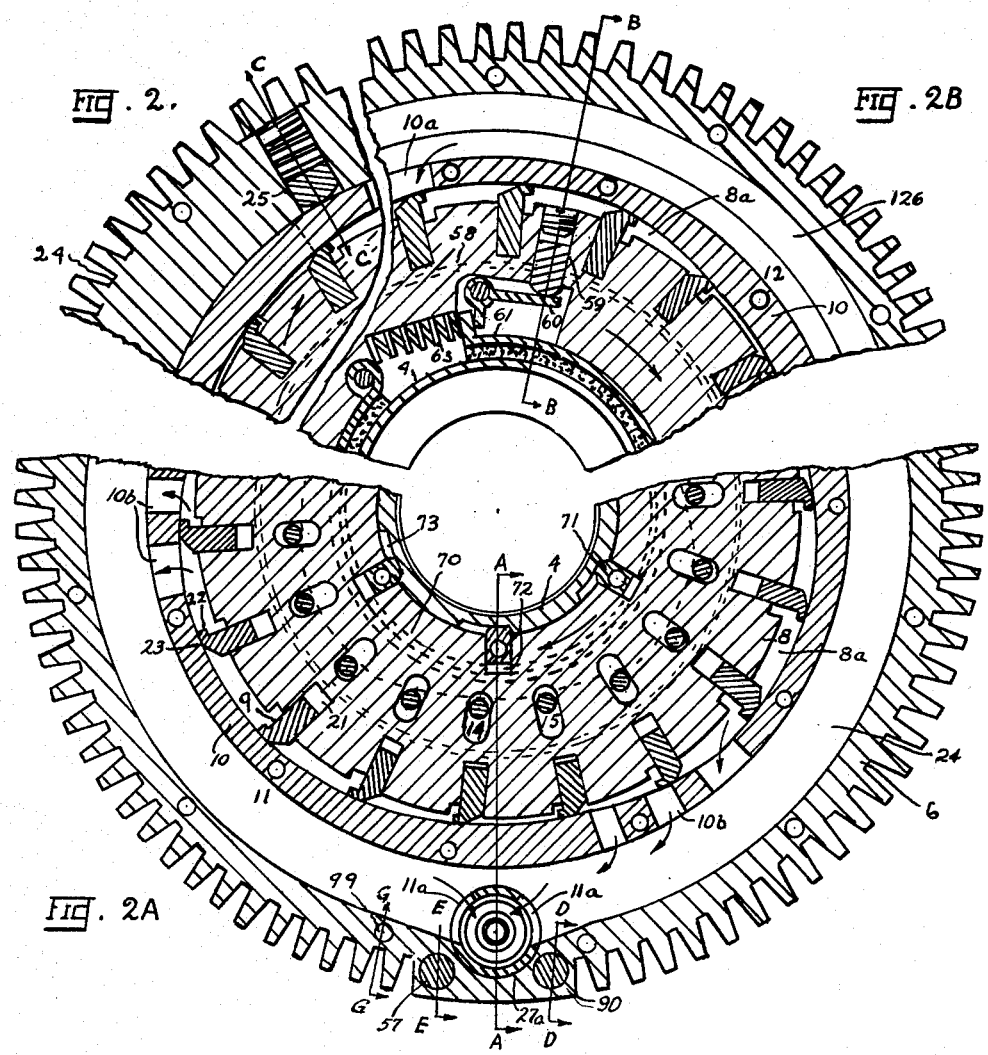

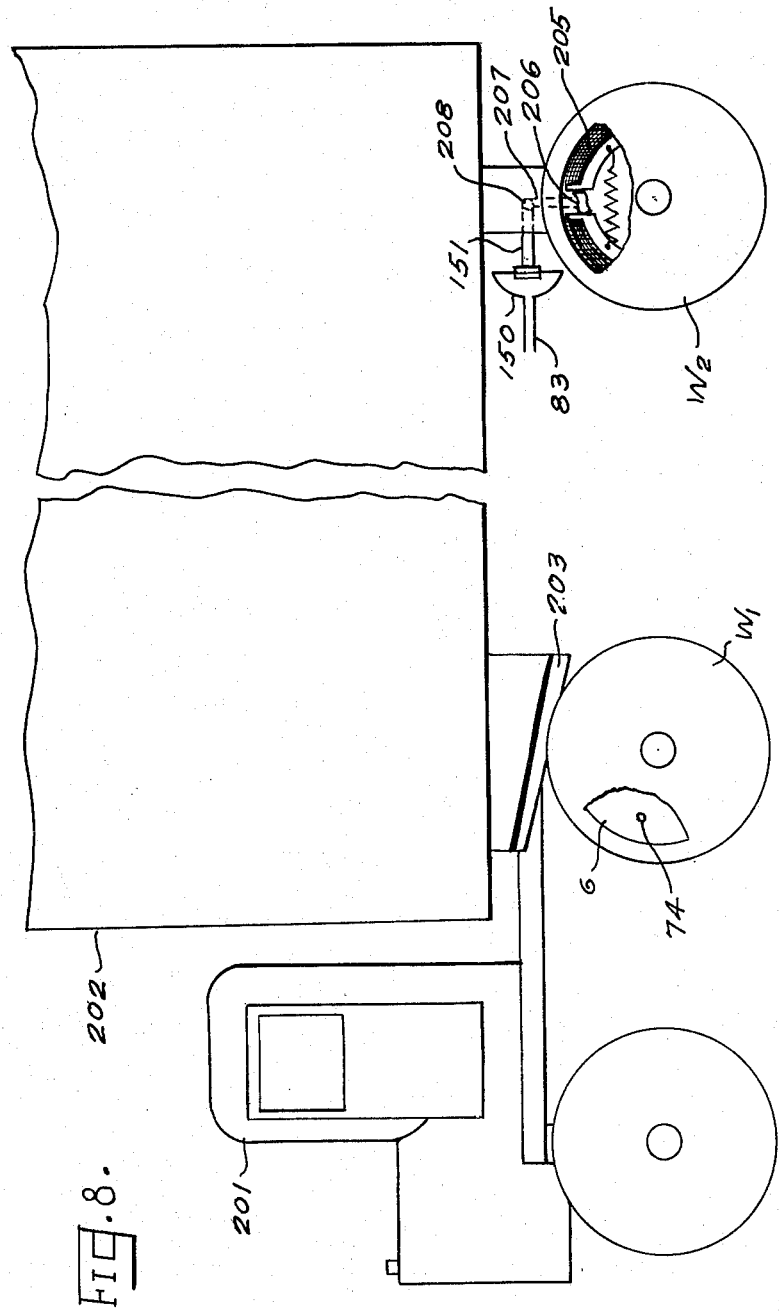

United States Patent Office 2,963,117
Patented Dec. 6, 1960

2,963,117

HYDRAULIC BRAKING SYSTEM

Daniel F. McGill, 2344 NE. 52nd Ave., Portland 13, Oreg.

Filed Oct. 22, 1956, Ser. No. 617,411

11 Claims. (Cl. 188—86)

This invention relates to hydraulic brakes and a braking system, particularly for heavy duty truck and trailer combinations capable of hydraulically braking the wheels of the tractor and automatically above a predetermined braking effort on the tractor wheels to cut in the friction air brakes on the trailer, or, at the option of the vehicle operator, cut the trailer air brakes in first and after a predetermined braking effort on the friction brakes to automatically cut in the hydraulic brakes on the tractor.

The general object is to let the hydraulic brakes take over the entire vehicle braking to maintain speed on hills and handle all of the stops, except emergency stops, and all of the braking below a predetermined braking effort and then to automatically cut in the trailer friction brakes.

Another important object is to provide means so that the driver can optionally operate the trailer friction brakes first and then automatically cut in the hydraulic brakes above a predetermined braking effort on the friction brakes.

Another object is to provide a hydraulically operated air valve to automatically cut the friction brakes in above a predetermined braking effort on the hydraulic brakes and to automatically release the friction brakes as the vehicle braking effort is released.

Another object is to provide a friction clutch to start an hydraulic rotor and put a brake pump in operation and to provide means to automatically release the friction clutch when the brake pedal is released.

A further object is to provide vanes on the inner diameter of the pump rotor and splines on the driving shaft to form hydraulic splines when pressure is applied to the top of the rotor lock vanes.

Another object is to provide a rotary vane pump that will operate with the same efficiency while the pump is operating in either direction and to hold while the vehicle is stationary on a hill with the brakes applied.

Another object is to provide a rotary vane pump for the brake with vanes operated positively between cams and with the vanes having a step on one side with the bearing surface equally divided on the step and on the main body of the vane.

Another object is to provide a rotor lock valve that will direct oil pressure to the top of the rotor lock vanes when the pump is operating and to automatically release the pressure from the top of the rotor lock vanes when the brake is released.

Another object is to provide a sealed expansion chamber to keep air out of the system.

Another object is to provide an expansion valve that will remain closed and permit reverse braking and automatically open the ports to the expansion chamber when a predetermined pressure is in the forward drive chamber.

Another object is to provide a remote control pump to operate the control valves and means to automatically start and release the pump.

Another object is to provide a valve to automatically close a port between the control pump and expansion chamber when the foot pedal is depressed and to open the port when the foot pedal is released.

Another object is to provide a pressure operated second master brake cylinder when the air attains a predetermined pressure in the air brake lines to cut in the hydraulic brakes.

Another object is to provide a valve in the hydraulic fluid control lines that will direct the fluid to operate the brake controls on the hydraulic brake or, when the valve position is changed, to direct the fluid to the friction air brake controls to operate the trailer brakes first.

Another object is to provide a brake valve to restrict the passage of oil from the discharge chamber to the intake chamber and means to operate the valve.

In the embodiment of the hydraulic brake and the braking system disclosed the brake is comprised of a pump having a drive shaft driven by the wheel of the vehicle, in which the drive shaft runs free with the wheel except when the brake is applied and then automatically by remote control it is locked to the rotor of the pump to start the pump operating. A valve is mounted between the intake and discharge sides of the pump to form a restriction to the passage of oil as it goes from the pressure chamber to the intake side of the pump. This oil pressure tends to retard the rotation of the vehicle wheel and as the valve is completely closed the wheel is held stationary.

An adaptor replaces the conventional brake drum and operates the drive shaft as the wheel turns. Special hydraulic means are provided to automatically connect the pump driving shaft to the pump rotor as the brake is applied and to release the rotor from the shaft when the brake is released.

The foot pedal controls operate through a master brake cylinder well known to the public. When the brake pedal is depressed the fluid pressure by remote control puts the hydraulic brake in operation and after a predetermined braking effort on the hydraulic brakes the trailer friction air brake is cut in.

When the roads are slippery the vehicle operator can, by changing the position of the valve in the fluid line, operate the air friction brakes in the trailer first and then after a predetermined braking effort on the trailer the hydraulic brakes on the tractor will cut in.

This being a closed system it is possible to operate at oil temperatures at or higher than the flash point of oil, making a great difference between the oil and air temperatures. A fan, not shown in the drawings, can be operated off the drive shaft of the vehicle to circulate high velocity air over fins on the brake to dissipate heat. A thermostat mounted on the brake will cut the fan in automatically above a predetermined oil temperature and turn it off below the set temperature. The horse power required to operate the fan will be transferred as braking horse power through the differential to the tractor wheels to reduce the braking effort of the hydraulic brakes.

In the invention the present hydraulic brakes may be adapted to replace all of the friction brakes on the vehicle or may be applied to the drive shaft of the vehicle to do only that part of the braking that can be done through the differential.

These and other objects and advantages of the invention will be apparent and the invention will be better understood from the following description in the accompanying drawings. It is to be understood that various changes may be made in the construction and arrangement of parts and that certain features may be used without others.

In the drawings:

Figure 1 is a longitudinal sectional view of the brake including the inner bearings and axle of the vehicle wheel with an adaptor to drive the pump;

Figure 2 is a fragmentary cross section taken on the line C—C in Figure 1;

Figure 2A is a fragmentary cross section taken on the line A—A in Figure 1;

Figure 2B is a fragmentary cross section taken on the line B—B in Figure 1;

Figure 3 is a sectional view of an expansion valve taken on line D—D in Figure 2B;

Figure 4 is a schematic view of the operating controls of the braking system;

Figure 5 is a sectional view of a double check valve appearing in Figure 4;

Figure 6 is a fragmentary sectional view of the parking lock taken in the plane of line F—F in Figure 1 but at a different point on the wheel;

Figure 7 is an enlarged sectional view of the pin, spring and vane in Figure 1; and Figure 8 is a view of a tractor and trailer vehicle combination showing the wheel arrangement of the hydraulic brake pumps and the friction brakes.

In Figure 1, numeral 1 designates the stationary axle of a tractor with 2 the inner wheel bearings and 3 the adaptor, that replaced the friction brake drum, to operate the pump drive shaft 4 through a gear coupling 5. The gear coupling is mounted loosely to accommodate any looseness that may develop in the wheel bearing 2 and drives the pump shaft 4 at all times with the wheel. Numeral 6 designates the pump housing and 7 the bracket that holds the pump housing stationary, with 8 designating the rotor and 9 the vanes which form with the rotor and the outer pump cam 10 a plurality of pumping chambers 8a. Pumping chambers 8a are in open communication with annular chambers 11 and 12 through ports 10a and 10b in Figure 2. When rotor 8 revolves in the direction of the arrow on the rotor in Figures 2A and 2B, ports 10a are suction ports and ports 10b are discharge ports. Ports 10a communicate with chamber 12 which is thus a suction chamber and ports 10b communicate with chamber 11 which is thus a pressure chamber. One of the suction ports appears in Figure 2B and two of the discharge ports appear in Figure 2A.

Cams 13 are mounted on the inner diameter of the pump housing with roller 14 mounted in slots 15 in the rotor and having pin 16 mounted with one end bearing on roller 14 and projecting through holes 17 in the rotor to vanes 9. Pin 16 on its outer end has a reduced stem 18 projecting into hole 19 in the vane 9, with spring 20 in compression between the vane and pin, shown in an enlarged view in Figure 7. The end of the stem 18 on pin 16 has a clearance of a few thousandths of an inch from the vane to allow for unequal distances between the outer and inner cams 10 and 13, respectively.

The rollers, pins, springs and vanes operate in unison as the rotor rotates with a set tension on the springs to assure a positive seal between the vane and outer cam 10 at all low speeds of the vehicle. Vanes 9 are mounted in rotor slots 21 and have a step on one side with the bearing surface 23 equally divided on the step and the main body of the vane. With the pressure on the step side of the vane, the pressure on top of the step tends to hold the vane against the outer cam, but with the pressure on the opposite or main body side of the vane, having twice the end area exposed, the pressure will tend to force the vane off the outer cam. Therefore, it is necessary at low speeds of the vehicle to have spring 20 to hold the vane in contact with the outer cam. With the pressure on the main body side of the vane the pressure will act against the large exposed end surface of the main body and not on top of the step. Therefore, it will require spring tension in one direction of rotation to hold the vane in contact with the outer cam. This permits the rotor to operate in either direction.

As the vehicle operates in the forward direction indicated by the arrow on rotor 8 in Figures 2A and 2B oil chamber 11 in Figures 1 and 2 becomes a pressure chamber on the discharge side of the pump with chamber 12 a suction chamber on the intake side. Partition 24 separates the two chambers with relief valve 25 mounted in partition 24 to relieve oil from chamber 11 to chamber 12 should excess pressure exist. Spring 26 is set to relieve the oil in chamber 11 above a predetermined pressure.

Brake valve 27 is mounted in a cylinder 27a in the pump housing between oil chambers 11 and 12 with spring 28 holding the valve open when the brake is not applied. Stem 29 on the valve forms a stop when the valve is completely closed. The degree of braking is accomplished by partly closing the valve and when the valve is completely closed the wheels are held stationary. Cylinder 27a has ports 11a communicating with pressure chamber 11 and ports 12a communicating with suction chamber 12. The latter ports are always open but ports 11a may be closed by valve piston 27 which is ported at 27b to equalize pressure on opposite ends of the piston.

To apply the brake, pedal 30 is depressed operating master brake cylinder 31 putting fluid in line 32, sending the fluid through valve 33 to double check valve 34, through line 35 to operate plunger 36, held extended by spring 37, with fluid pressure compressing spring 37 to operate electric switch 38 to energize motor 39 through wires 40 from an electric supply line 41, which starts the remote control pump 42. Line 35 also connects with line 43 with the fluid pressure operating valve 44 against spring 45 with shoulder 46 operating as a stop on the valve after the ports are out of register with line 48 to expansion chamber 50.

Expansion chamber 49 has two fluid chambers 50 and 51 divided by a ported partition 52 and having plunger 53 working against spring 54 to hold a slight pressure on the oil in the expansion chamber 50 keeping air out of the system. Pump 42 gets its supply of oil through lines 55 and 48 leading to the expansion chamber. The discharge line 56 leads from the remote control pump to the rotor lock valve 57 and on through line 56 into line 58 to top of piston 59 to operate linkage 60 in Figure 2 to energize friction clutch 61 on pump shaft 4. When the brake pedal is released clutch spring 63 holds the brake off drive shaft 4.

When the foot pedal is released the fluid pressure is released in all of the control lines cutting off the motor and spring 46 in valve 44, putting the valve port 47 back to register with line 48 to the expansion chamber and with line 88 leading to connect with line 56 at the discharge side of the remote control pump. As the pressure is released on the end surface of valve 57 spring 64 forces the valve to cause the ports 66 to register permitting the oil pressure from line 67 to escape through line 89 to line 56 and back to the expansion chamber 50, thereby releasing both the rotor lock vanes and the friction clutch freeing the rotor from the drive shaft. Line 67 derives its pressure from the brake pump in Figures 1 and 2 as well presently be described.

In Figure 3, expansion valve 90 taken on line D—D in Figure 2, has a spring 91 holding the valve in a position that the valve ports 92 are out of register with the oil port in chamber 12 and line 93 leading to expansion chamber port 94. When the oil pressure in chamber 11 exceeds the tension on spring 91 to cause ports 92 to register with oil chamber 12 and line 93 leading to the expansion chamber, the oil is free to flow in either direction. Line 93a leads to spring 91 enclosure to permit the oil valve to operate.

When remote control pump 42 is started, oil pressure in line 56, 58 engages friction clutch 61 as previously described, this oil pressure at the same time being transmitted through line 89, port 66 of rotor lock valve 57 and lines 67 and 70 to the ends of vanes 71 on the inner diameter of the rotor. These vanes are mounted in radial slots 72 for inward movement into grooves 73 in the pump drive shaft 4 to form hydraulically actuated splines for locking the brake pump rotor rigidly to the drive shaft. Also, at the same time, brake valve 27 is at least partially closed by the action of fluid pressure on valve piston 75 transmitted through line 74 from master cylinder 31. The brake pump then develops fluid pressure in chamber 11 when the rotation is in a forward direction.

After the friction brake piston 59 and rotor lock vanes 71 have moved to the limits of their travel, the fluid pressure from remote control pump 42 builds up in line 56, 58 depressing piston valve 57 as far as permitted by stop shoulder 65 bringing piston port 66 into communication with line 67 and double check valve 68. In this depressed position of valve 57, communication between lines 67 and 89 is interrupted. Fluid pressure in brake pump chamber 11 is then transmitted through line 69, double check valve 68, port 66 and line 67 to maintain rotor lock vanes 71 engaged in the grooves 73 in the pump drive shaft. When the direction of rotation is reversed the same sequence of events occurs except that in such case brake pump chamber 12 becomes the pressure chamber and applies fluid pressure to line 67 through line 69a, check valve 68 and valve port 66. Port 62a is connected with expansion chamber port 94 to relieve oil from the spring chamber in valve 57 when spring 64 is compressed.

When oil pressure in chamber 11 exceeds the tension on spring 76 on plunger 77 the shoulder 78 operates on the button 79 in air valve 79a to apply the friction brakes in the vehicle trailer. Line 80 is the air supply and 81 the line leading to the double check valve 82 and 83 the line leading to the trailer brakes. The trailer friction brakes are symbolized by the diaphragm chamber 150 having a thrust rod 151 arranged to operate movable brake shoes. Line 85 leads to alternate air controls to be described presently. Remote control pump 42 requires very little volume; therefore, pump relief valve 86 allows the oil to recirculate back to the intake side of the pump above a predetermined oil pressure.

In Figure 4, pistons 95 are mounted in cylinders 96 in block 97 with ports 98 leading to port 99 in Figure 2A, to pressure chamber 11 in each tractor wheel. Line 100 leads to plunger 77 to operate the trailer friction brake air valve. The fluid in cylinders 96 and line 100 is separated from the brake oil in pressure chamber 11. When the road traction is normal each brake will operate with approximately the same oil pressure, but in the event of slippery roads and one or more of the wheels slip, the oil pressure in its individual pump chamber will be reduced to equal the wheel traction on the road, permitting the wheels with good traction and higher oil pressure tending to drive the slipping wheel backward through the tractor axle differential gears. Pistons 95 with equal oil pressure coming through ports 98 will maintain an equal fluid pressure in cylinders 96 and line 100, but with one of the wheels slipping the plunger with the reduced oil pressure will remain at the top of the cylinder 96 while the other plungers will project into cylinders 96 to operate plunger 76 in Figure 4. With the oil stabilizer the wheel doing the most work will operate the air valve hydraulic plunger 77 to cut in the friction brakes on the trailer.

If the roads are slippery and the vehicle operator wants to operate the friction brakes on the trailer first, he can change the position of valve 33 to dotted lines 33a to direct the braking fluid to plunger 101 to overcome tension on spring 102 and operate a second air valve 103, getting its air supply at 104 and its discharge leading through line 85 and the double check valve 82 to line 83 to operate the friction brakes in the trailer. Line 106 leads to plunger 107 that operates against spring 108. When the trailer braking effort causes the air pressure in line 106 to exceed the set tension on spring 108 a second master cylinder 31a is operated to put fluid pressure on line 109 with the fluid going through double check valve 34 to put the hydraulic brakes in operation. This gives the vehicle operator the option of operating first with the hydraulic brakes or the trailer friction brakes and having the brakes automatically cut in the other above a predetermined braking effort on one or the other system.

Figure 5 illustrates a double check valve of the type used at various points in the brake system. For example, valve body 34 has a cylindrical bore containing a free piston 34a of a length less than half the length of the bore. One end of the bore is connected to pressure pipe 33a and the other end is connected to pressure pipe 109. Lateral pipe 35 is connected to a mid point of the bore. Fluid pressure applied through pipe 33a has driven the piston to one end of the bore, closing the end of pipe 109 and communicating the fluid pressure to pipe 35. Upon the release of pressure in pipe 33a the piston remains by friction in the same position permitting back flow from pipe 35 to pipe 33a. When pressure is applied to pipe 109 the piston is driven to the other end of the bore closing pipe 33a and establishing fluid connection this time between pipes 109 and 35 and permitting back flow from pipe 35 to pipe 109 when the pressure in the latter is released.

In Figure 6 a cross section segment 110 of the sprocket on the outer rim of adaptor 3, taken in the plane of line F—F of Figure 1, but at a different point on the adaptor, is shown with linkage 111 mounted on pin 112 and having a projection 113 to lock into sprocket 110 when pressure is applied on lever 115 through the tension on spring 116 attached at one end at 118 on rod 119. Lever 115 is pivoted on pin 120 and forces projection 113 into a locking position against tooth 114. Spring 121 is mounted on one end to a stationary member 122 with the other end attached to the lever 111 at 123 to release the parking lock after rod 119 is released, from a point not shown, and pressed against the outer end of lever 115 to remove the wedge at 125 and spring 121 will lift linkage 111 free from sprocket 110. In the event projection 113 on linkage 111 lands on sprocket tooth 114 spring 116 will permit the locking of the rod 119 and when vehicle moves either forward or backward projection 113 will be forced in to lock sprocket 110 by spring 116 and hold the wheel stationary indefinitely.

An obstruction, not shown, can be put in the way of parking rod 119 to prevent its operation until the hydraulic brakes hold the vehicle stationary.

Oil chambers 11 and 12 are provided with fins 126 to assist in rapid transfer of B.t.u. from the oil to the aluminum housing and out to the fins 127 surrounding the housing to permit escape of the B.t.u. to high velocity air circulated over the fins.

Figure 8 shows a vehicle combination having a tractor unit 201 and a trailer unit 202 of the semi-trailer type wherein the front end of the trailer is supported on a conventional fifth wheel structure 203 on the tractor unit. Rear wheels $W^1$ of the tractor unit are equipped with hydraulic brake pumps 6 as shown in Figure 1, although instead of coupling the brake pumps directly to the wheels as shown in Figure 1 a single brake pump may, if desired, be coupled to the tractor drive shaft to operate on the tractor wheels $W^1$ through the conventional rear axle differential as hereinabove mentioned.

The rear end of trailer 202 is supported on wheels $W^2$ equipped with conventional friction brakes 205 actuated by the usual cam 206. Cam 206 is rotated to apply the brakes by a lever 207 having a pivotal connection at 208 with the thrust rod 151 from the pneumatic diaphragm chamber 150 previously described in Figure 4. For convenience in illustrating the foregoing structure, the tires have been omitted from the wheels.

When valve handle 33a in Figure 4 is turned to its full line position, operation of brake pedal 30 and master cylinder 31 first energizes the hydraulic brake pumps 6 to apply a braking effort to the tractor wheels W¹. The attainment of a predetermined hydraulic pressure in the brake pumps will subsequently operate the air valve 79a to apply friction brakes 205 on the trailer.

When valve handle 33a is turned to its broken line position, the operation of brake pedal 30 and master cylinder 31 first operates air valve 103 to apply the friction brakes 205 on the trailer. The attainment of a predetermined air pressure in the friction brake compressed air line 83 will then subsequently actuate master cylinder 31a to energize the hydraulic brake pumps 6 on the tractor. In this way the initial or primary braking effort may be applied first to either the tractor or the trailer, depending upon the position of valve handle 33a.

Having now described my invention and in what manner the same may be used, what I claim as new and desire to protect by Letters Patent is:

1. In a hydraulic braking system in a vehicle comprising a pump having a stationary housing, a rotor, a freely running drive shaft with splines mounted thereon, intake and discharge chambers, a brake valve mounted between said intake and discharge chambers, vanes in said rotor to form working chambers, a friction clutch mounted on said rotor, a second set of vanes on the inner diameter of said rotor, remote control means to energize said friction clutch on said drive shaft to start said pump, means to close said brake valve to restrict fluid passage from said discharge to said intake side of the pump, and port means to transfer fluid pressure from said discharge chamber to the top of said second set of vanes in said rotor to lock the rotor to said drive shaft.

2. In a hydraulic braking system in a vehicle, a brake pump, a brake valve, a manually operated master fluid cylinder, a remote control oil pump connected with a fluid pressure line, a motor to operate said pump, a fluid pressure plunger actuated by said master cylinder to initiate operation of said motor, an expansion chamber, a fluid connection from said fluid pressure line to said expansion chamber, a valve in said fluid connection, means actuated by fluid pressure in said master cylinder to close said valve when the brakes are applied, a plunger actuated by said master cylinder to operate said brake valve, air pressure operated friction brakes, an air valve for controlling said friction brakes, a piston for actuating said air valve, a fluid connection from said master cylinder for actuating said piston, and a manual valve in said last fluid connection.

3. In a hydraulic braking system in a vehicle, a brake pump, discharge and intake chambers in said pump, a brake valve mounted between said discharge and intake chambers, compressed air operated friction brakes, means to cut in the friction brakes at a predetermined fluid pressure in said brake pump, a master cylinder fluid pressure means to control the operation of said brake valve, an air valve to first operate the friction brakes, a fluid connection from said master cylinder to a piston for actuating said air valve, a manual valve in said fluid connection, and an air plunger actuated by compressed air operating the friction brakes to operate a second master cylinder to actuate said brake valve and cut in the hydraulic brakes at a predetermined air pressure.

4. In a hydraulic braking system, a rotary vane pump, said pump having discharge and intake chambers, a stationary housing having an outer cam, a brake valve mounted between said chambers, a drive shaft permitted to run freely when the brake is not applied, vanes mounted in said pump rotor, said vanes, rotor and pump housing cam forming working chambers, a step on one side of said vanes, inner cams mounted on said housing, rollers mounted on said inner cams, roller pins, springs and vanes mounted between inner and outer cams, a second set of vanes mounted on the inner diameter of the rotor, a friction clutch mounted on said rotor, means to lock said friction clutch to said drive shaft to start said rotor, means to lock said inner vanes against rotation relative to said drive shaft, means to operate said brake valve, and means actuated by fluid pressure in said discharge chamber to operate friction brakes above a predetermined hydraulic braking effort.

5. In a vehicle braking system, brake pumps on the wheels of the vehicle, a fluid pressure control system connected with a manually operated master cylinder and a compressed air operated master cylinder, brake valves connected between the intake and discharge sides of said pumps having operators actuated by said fluid pressure control system, a compressed air operated friction brake system, an air valve actuated by fluid pressure developed by said brake pumps for energizing said friction brake system, an air valve having an operator actuated by fluid pressure in said fluid pressure control system for energizing said friction brake system, an air line connection from said friction brake compressed air system to said compressed air operated master cylinder, and a manual valve in said fluid pressure control system having one position connecting said manually operated master cylinder with said brake valve operators to actuate said brake pumps prior to said friction brake system and having another position connecting said manually operated master cylinder with said air valve operator to energize said friction brake system prior to said brake pumps.

6. In a dual braking system for a tractor and trailer vehicle combination, hydraulic brake pumps on one set of wheels of the combination and compressed air operated friction brakes on another set of wheels of the combination, a brake pump rotor in each hydraulic brake pump, a drive shaft for said rotor driven by a wheel of said one set and freely rotatable relative to said rotor when said brake pump is not operating, fluid pressure operated means to lock said rotor to said drive shaft, a remote control pump driven by an electric motor arranged to supply fluid pressure for said locking means, a master cylinder having a piston connected with a brake pedal, a fluid pressure operated switch arranged in a circuit to energize said motor, an hydraulic line from said master cylinder to said switch, operation of said brake pedal closing said switch and initiating operation of said control pump to lock said drive shaft to said brake pump, said brake pump having intake and discharge chambers, a brake valve mounted between said discharge and intake chambers to restrict passage of fluid and retard said drive shaft, means actuated by said master cylinder to operate said valve, a pressure operated air brake valve with port connections to said discharge chamber for operating said air valve at a predetermined fluid pressure in said discharge chamber to apply said friction brakes, a valve in said hydraulic line to direct fluid pressure from said master cylinder alternatively to a second pressure operated air brake valve to apply said friction brakes first, a compressed air supply connected with said air valves for applying said friction brakes, a piston actuated by the air pressure applied to said friction brakes, a second master cylinder actuated by said piston, and an hydraulic line from said second master cylinder to said fluid pressure operated switch to initiate operation of said remote control pump and said hydraulic brake pumps at a predetermined braking effort on the friction brakes.

7. In a dual braking system for a tractor and trailer vehicle combination, an hydraulic brake pump on each wheel of the tractor and a compressed air operated friction brake system on the trailer, each brake pump having a drive shaft permitted to run freely, intake and discharge chambers in each pump, a brake valve mounted between said discharge and intake chambers to restrict fluid discharge from the discharge chamber, means to lock each drive shaft to its pump, a pressure operated air valve to operate the friction brakes on the trailer at a predetermined fluid pressure in the discharge chambers of said brake pumps, and stabilizer pistons each connected to receive the fluid pressure from one of said brake pumps and arranged to transmit the highest of said pressures to said air valve to cause the tractor wheel with the best road traction to operate said air valve.

8. In an hydraulic braking system on a vehicle, a brake pump, a brake valve mounted between the discharge and intake sides of the pump, a remote control pump, a master brake cylinder arranged to initiate operation of said remote control pump and to actuate said brake valve to restrict passage of fluid from the discharge to the intake side of said brake pump, means operated by fluid from said remote control pump to connect said brake pump with a wheel of the vehicle to operate said brake pump when the vehicle is moving, an expansion chamber in the fluid system of said brake pump, an expansion valve having ports leading from the reverse discharge chamber of the brake pump to said expansion chamber, and means to hold the valve ports out of register with the expansion chamber until fluid pressure in the forward pressure chamber of the brake pump exceeds the valve holding means and causes the valve ports to register with the expansion chamber.

9. A dual braking system for vehicles comprising a brake pump hydraulic system and a friction brake fluid pressure system, a plurality of brake pumps in said brake pump hydraulic system each having a stationary housing with a brake valve between intake and discharge chambers in said housing, fluid pressure actuated operators for said brake valves, a rotor in each pump, a drive shaft mounted for rotation relative to said rotor, locking means in said rotor movable by fluid pressure to lock the rotor to said drive shaft and operate the pump when said drive shaft is rotating, a fluid pressure control system connected to said operators and said locking means to operate the brake valves and move said locking means to lock the rotors to the drive shafts in said pumps, a valve in said friction brake fluid pressure system operable by increasing hydraulic pressure in said discharge chambers to energize said friction brake fluid pressure system, valve means for energizing said friction brake fluid pressure system prior to operation of said brake pumps, and means operable by increasing pressure in said friction brake fluid pressure system for energizing said control system and thereby operating said brake pump system.

10. A dual braking system for vehicles comprising a brake pump hydraulic system and a compressed air friction brake system, fluid pressure actuated operators for said brake pump system, a fluid pressure control system, manually operated means for energizing said control system, a selector valve in said control system having one position connecting said manually operated energizing means with said operators for said brake pump system, an air valve in said friction brake system operable by increasing hydraulic pressure in the brake pumps for energizing said friction brake system, a second air valve in said friction brake system for energizing said friction brake system, a fluid pressure actuated operator for said second air valve, said selector valve having a second position connecting said manually operated energizing means with said operator for said second air valve for energizing said friction brake system, and means operable by increasing air pressure in said friction brake system for energizing said control system and thereby operating said brake pump system.

11. A dual braking system for a vehicle combination having a tractor unit and a trailer unit, comprising hydraulic brake pumps operative on wheels of one of said units and friction brakes operative on wheels of the other unit, a fluid pressure control system, brake valves connected between the intake and discharge sides of said pumps having operators actuated by said control system, a friction brake fluid pressure system for operating said friction brakes, a first valve in said friction brake fluid pressure system actuated by fluid pressure developed by said brake pumps for energizing said friction brake fluid pressure system, a second valve in said friction brake fluid pressure system having an operator actuated by fluid pressure in said control system for energizing said friction brake fluid pressure system, means operable by pressure in said friction brake fluid pressure system to energize said control system, manually operated means for energizing said control system, and a manual valve in said control system having one position connecting said manually operated energizing means with said brake valve operators to actuate said brake pumps prior to said friction brakes and having another position connecting said manually operated energizing means with said operator of said second valve in said friction brake fluid pressure system to actuate said friction brakes prior to said brake pumps.

References Cited in the file of this patent
UNITED STATES PATENTS

| | | |
|---|---|---|
| 474,958 | Hollingsworth | May 17, 1892 |
| 1,631,800 | Dotsch | June 7, 1927 |
| 1,694,020 | Price | Dec. 4, 1928 |
| 1,735,529 | Dey | Nov. 12, 1929 |
| 1,776,452 | Rosenthal | Sept. 23, 1930 |
| 2,001,585 | Roeder | May 14, 1935 |
| 2,177,511 | Aikman | Oct. 24, 1939 |
| 2,241,189 | Dick | May 6, 1941 |
| 2,434,701 | Kemler | Jan. 20, 1948 |
| 2,478,612 | Walma | Aug. 9, 1949 |
| 2,681,713 | Chambers | June 22, 1954 |

FOREIGN PATENTS

| | | |
|---|---|---|
| 310,297 | Germany | Jan. 11, 1919 |
| 368,141 | Italy | Nov. 14, 1938 |